United States Patent [19]

Gee

[11] Patent Number: 5,186,079
[45] Date of Patent: Feb. 16, 1993

[54] DRIVELINE TORQUE FUSE

[75] Inventor: Thomas A. Gee, Allen Park, Mich.

[73] Assignee: Eaton Corporation, Cleveland, Ohio

[21] Appl. No.: 802,151

[22] Filed: Dec. 4, 1991

[51] Int. Cl.⁵ ............................................. F16H 57/02
[52] U.S. Cl. ..................................... 74/607; 464/32; 403/2
[58] Field of Search ................. 74/607; 403/2; 464/32

[56] References Cited

U.S. PATENT DOCUMENTS

| | | | |
|---|---|---|---|
| 2,773,369 | 12/1956 | Klemm | 464/32 |
| 3,923,290 | 12/1975 | Tillis | 403/2 X |
| 3,982,408 | 9/1976 | Wright | 464/32 |
| 4,411,635 | 10/1983 | Boothroyd et al. | 403/2 X |
| 4,669,999 | 6/1987 | Miller | 464/10 |
| 4,932,280 | 6/1990 | Becker et al. | 74/665 G |
| 4,971,267 | 11/1990 | Fulton et al. | 244/75 R |

FOREIGN PATENT DOCUMENTS

| | | | |
|---|---|---|---|
| 2315036 | 1/1977 | France | 464/32 |
| 0955368 | 4/1964 | United Kingdom | 464/32 |

*Primary Examiner*—Dirk Wright
*Attorney, Agent, or Firm*—R. A. Johnston

[57] ABSTRACT

A torque fuse for a vehicle driveline has a sleeve splined at one end to the vehicle power transmission output shaft with the other end clip-splined to the driveshaft yoke. An intermediate pre-weakened frangible area of the sleeve is designed to rupture at a torque level less than the critical torque level of the driveshaft. A washer swaged into the sleeve enables the sleeve to be bolted to the end of the transmission output shaft. An auxiliary tailstick bolted to the transmission case has an auxiliary bearing to support transverse loads on the sleeve at the yoke end thereof.

4 Claims, 1 Drawing Sheet

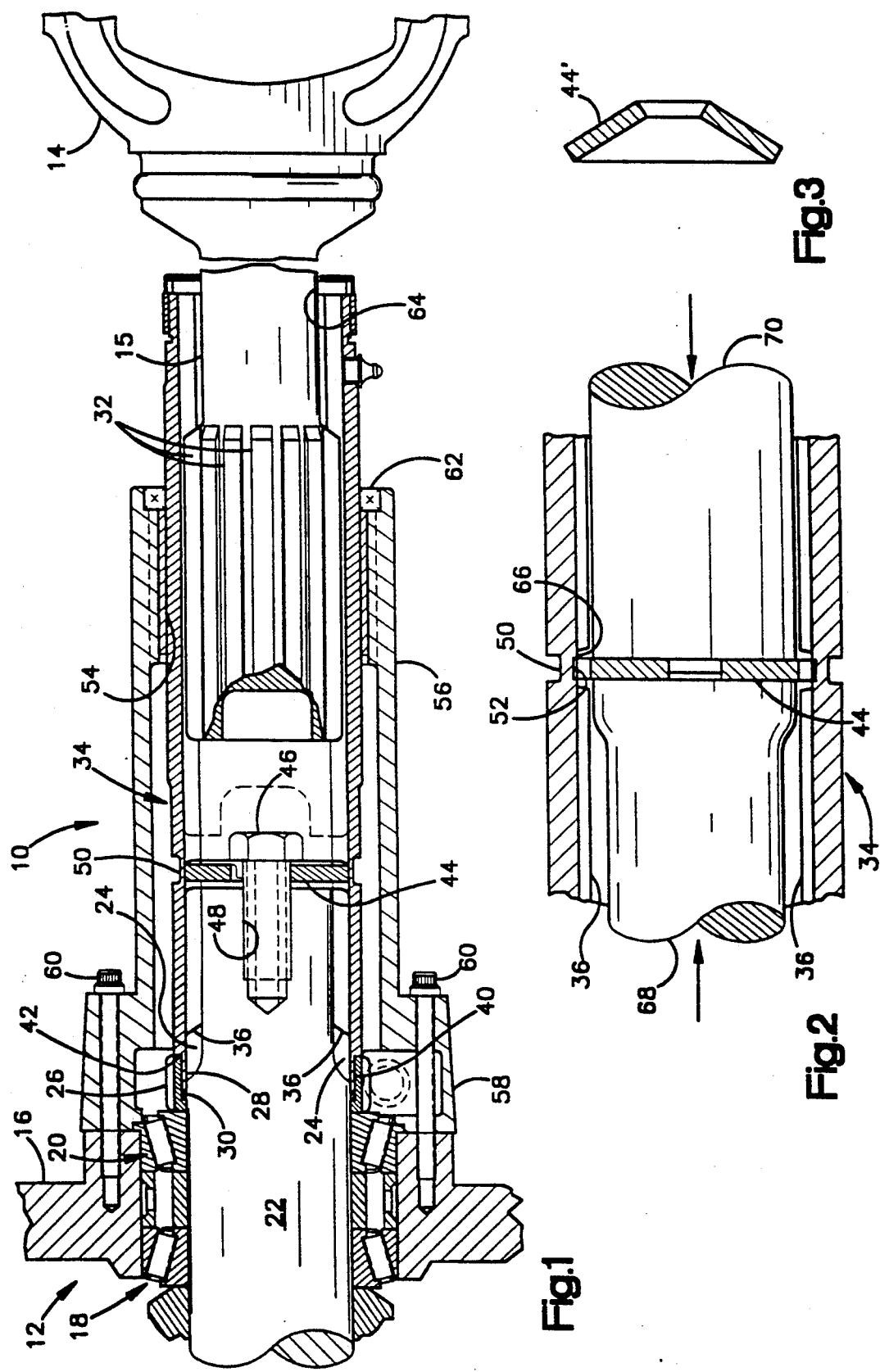

DRIVELINE TORQUE FUSE

BACKGROUND OF THE INVENTION

The present invention relates to vehicle powertrain driveshafts, and particularly driveshafts of the type interconnecting a power transmission and a wheeled drive axle. In many motorized vehicles, it is commonplace to provide an articulated driveline between the engine power transmission, mounted to the vehicle chassis frame or body structure, with a driveshaft having swiveled or universal joints therein for permitting the driveshaft to flex with movement of the wheel drive axle. In such vehicle drivelines, and particularly heavy duty over-the-road trucks, it has been found desirable and advantageous for weight saving to form the drive shaft of relatively thin wall, high-strength premium material such as graphite impregnated composite material. When such materials are employed for the driveshaft, it is extremely costly to replace the driveshaft in the event that there is a failure of the driveshaft. One particularly common type of failure of the driveshaft is that of torsional failure resulting from improper clutch engagement.

It has thus been desired to provide a torque fuse in a vehicle driveline ahead of the driveshaft, or at the transmission output to protect the vehicle from torsional driveshaft failure under heavy service loads.

It has also been desired to provide a torque limiting fuse in the vehicle driveline to protect the driveshaft and to make such a provision without the need for any significant alterations to the construction and manufacture of the vehicle transmission and driveshaft. It has also been desired to enable such a torque fuse to be readily replaced in the field with only minor disassembly of the transmission or drive shaft and to be originally installed without modification of the transmission.

SUMMARY OF THE INVENTION

The present invention relates to drivelines for automotive vehicles, and in particular heavy trucks wherein substantial torque is transferred between the power transmission and the vehicle drive axle(s). The invention provides an adapter sleeve between the transmission output shaft and the vehicle articulated driveshaft, which sleeve is readily installed without requiring any significant disassembly to the transmission or the driveshaft. The sleeve of the present invention is splined internally to receive the transmission output shaft in one end, and the driveshaft yoke spline in the other end, with an intermediate region of the sleeve pre-weakened to fail frangibly in torsion when a predetermined torque limit, which is set below the critical torque limit of the driveshaft is reached. The present invention thus enables an existing vehicle driveline and particularly a heavy truck driveline to be modified with the incorporation of a torsionally frangible sleeve between the transmission output shaft and the propeller or driveshaft connecting the transmission to the drive axle. The torque-limiting fuse sleeve of the present invention may conveniently be installed without modification of the transmission or transmission output shaft, and may be installed in the field.

In the preferred practice, an auxiliary housing extension is bolted to the rearward portion of the transmission housing to provide an auxiliary support bearing for the torque fuse sleeve rearward of the frangible portion. The auxiliary bearing provides radial support for the driveshaft loads so that the frangible portion of the fuse sleeve receives only torque loads, and is free of bending loads imposed by the driveshaft.

BRIEF DESCRIPTION OF THE DRAWINGS

FIG. 1 a section view taken along the center line of a portion of the vehicle driveline employing the torque fuse of the present invention;

FIG. 2 is a section view of the sleeve of FIG. 1 showing the tunnel tools in place for inserting and securing the washer therein; and, FIG. 3 is a section view of the preferred washer prior to installation in the sleeve.

DETAILED DESCRIPTION

Referring to FIG. 1, the torque fuse of the present invention is indicated generally at 10 as installed in a vehicle driveline intermediate the aft or down line face of the transmission indicated generally at 12 and the forward or front yoke 14 of the vehicle driveshaft (not shown). The aft end of the driveshaft is for connection to one of the vehicle drive axles (also not shown). The transmission 12 has a housing or casing 16 which has suitable bearings denoted generally at 18 provided therein with the transmission power output shaft 22 journalled in the bearings.

The transmission output shaft 22 has a plurality of longitudinally extending circumferentially spaced splines provided on the end thereof as indicated by the reference numeral 24 in FIG. 1. Typically, a speedometer drive gear 26 is pressed over the spline portion and registered on the smooth surface of the output shaft adjacent the bearing 20. Speedometer drive gear 26 has an undercut or counterbore 28 provided in the outward or aft face thereof into which is received a suitable seal ring 30 which seals between the diameter 28 and the surface of the shaft and registers against the bottom of the counterbore in the gear 26.

The driveshaft yoke 14 has a center shaft portion 15 extending forwardly or up line toward the transmission and with the end thereof provided with a plurality of circumferentially spaced, longitudinally extending splines denoted by reference numeral 32. In the presently preferred practice, the splines 32 would be formed identical to the splines 24 on the transmission output shaft for convenience of manufacture; however, it is not a requirement of the present invention that the splines 32 be the same as splines 24.

Referring to FIGS. 1 and 2, a torque fuse sleeve has a plurality of splines 36 formed on the inner periphery thereof in longitudinally or axially extending arrangement and circumferentially spaced thereabout, and recessed axially from the forward end of sleeve 34 by an amount sufficient to clear the root of the splines 24 formed on the transmission output shaft. Torque fuse sleeve 34 has a reduced diameter portion 40 formed on the end thereof which is piloted into the counterbore 28 in the speedometer gear. The forward end of the sleeve 34 registers against the seal ring 30, effecting a slight axial compression thereof. A shoulder 42 is formed on the sleeve 34 intersecting the diameter 40 and registers against the axial face of the speedometer gear 26 to retain the speedometer gear on the output shaft.

The sleeve 34 has a washer or annular bulkhead 44 secured to the inner periphery thereof as shown in FIG. and by means which will hereinafter be described in greater detail.

The sleeve with washer 44 assembled securely thereto is secured onto the end of the transmission output shaft 22 by a suitable fastener, such as the bolt 46 secured through the washer into threads 48 provided in the end of the shaft 22.

The internal splines 36 formed in the sleeve 34 may extend from the reduced diameter forward end 40 of the sleeve 34 the entire length thereof; or, different splines may be formed from the exterior face of the washer to the outward end of the sleeve 34. However, in the presently preferred practice, common splines 36 are provided for the entire length of the inner periphery 34.

The driveshaft yoke shaft splines 32 are telescoped into the outward end of the sleeve 34 in longitudinally freesliding, but rotary power, transmitting engagement with the splines 36.

The effective driving area of the sleeve 34 is reduced in the region of the washer 44 to form a frangible portion 50 which, in the presently preferred practice, is formed by an annular groove in the outer circumference of the sleeve 34. However, it will be understood that the annular groove may be alternatively formed on the inner periphery; or, the effective frangible torsional driving area may be reduced by a plurality of apertures or formed in circumferentially spaced arrangement about the periphery of the sleeve 34 in the region of the washer 44. The particular geometric means chosen for reducing the effective driving area of the frangible portions 50 of sleeve 34 in the region of the washer or immediately adjacent thereto is a matter of design choice. However, it will be understood that the frangible portion 50 of the sleeve 34 is designed such that the portion 50 fractures, separating the sleeve 34 into two segments at an applied torque load below the critical torque load of the driveshaft connected to yoke 14. Thus, the sleeve 34 acts, in the frangible region 50, as a torque-limiting fuse for the driveline coupling between the transmission and the driveshaft 15.

In view of the reduced strength of the frangible portion 50 of sleeve 34, it has been found desirable to support the aft end of sleeve 34 against radial or transverse loads by a suitable sleeve bearing 54 which is supported in an auxiliary tail stock housing 56. Sleeve 34 is thus journalled in sleeve bearing 54. Auxiliary housing 56 has a flange 58 provided at one end thereof which is secured to the transmission housing 16 by bolts 60. A suitable seal 62 is provided at the end of the housing 56 to retain the transmission lubricant flowing through bearing 54 from escaping. Similarly, an annular seal 64 is provided in the end of sleeve 34 to seal the interior of the sleeve and retain any lubricant, such as grease, provided on the splines 32. Seal 64 is a sliding seal intended to accommodate the longitudinal or axial movement of the shaft 15 as shown in dashed outline in FIG. 1.

Referring to FIGS. 2 and 3, the washer or bulkhead 44 is initially received in a relieved area 66 formed in the splines 36 and swaging tools 68,70 are advanced into the sleeve 34 from opposite ends thereof and register against the opposite faces of the washer 44. Tools 68,70 are then forced against the opposite axial faces of the washer 44, deforming the outer periphery thereof outwardly into a recess 52 provided in the inner periphery of the sleeve 34.

In the presently preferred practice, the washer is initially formed in a conical or belleville configuration as denoted by reference numeral 44' in FIG. 3 to facilitate assembly past the splines 36 to the relieved region 66 of sleeve 34. Upon swaging by tools 68,70, the washer is flattened and squeezed axially causing the periphery thereof to expand outwardly into recess 52 to secure the washer in sleeve 34.

Alternatively, the washer may be formed initially flat and the outer periphery of washer 44 may be splined to permit sliding assembly between splines 36 and the sleeve 34.

The present invention thus provides a torque-limiting fuse sleeve or collar which may be readily assembled onto the output shaft of an existing vehicle power transmission and connected to the vehicle driveshaft without requiring significant modification of the existing transmission or driveshaft. The torque fuse of the present invention comprises a frangible portion of a sleeve which fractures at a torque level below the critical level for the vehicle drive shaft. The present invention thus provides a simple and economical means of torque fusing a vehicle driveline to prevent damage to the driveshaft which may be of a premium lightweight material, such as a composite material, replacement of which would be quite costly. The present invention thus provides a simple and low-cost way of torque-fusing a vehicle driveline which may be installed in the field without substantial modification of the driveline components.

Although the invention has hereinabove been described with respect to the illustrated embodiments, it will be understood that the invention is capable of modification and variation, and is limited only by the scope of the following claims.

I claim:

1. A torque-fuse link for a vehicle driveshaft having a critical torque level comprising:
    (a) a tubular driving member having;
        (i) first driving surfaces formed on the inner periphery in the input region thereof;
        (ii) second driving surfaces formed on the inner periphery in the region of the output end;
        (iii) a groove formed on the inner periphery intermediate said first and second driving surfaces;
    (b) an annular member disposed in said tubular member, said annular member having portions thereof formed into said groove to drivingly secure said annular member to said tubular member; and,
    (c) said tubular member having a frangible portion formed about the circumference thereof and intermediate said first and second driving surfaces, said frangible portion rupturable upon application between said first and second surfaces of a driving torque less than said critical level.

2. In a traction vehicle driveline having an engine coupled to a power transmission with an output shaft, the improvement comprising:
    (a) an articulated driveshaft means having open end drivingly connected to said drive axle and a critical torque level;
    (b) tubular torque-fuse means having the output end thereof drivingly connected to the other end of said driveshaft and the input end drivingly connected to said power transmission output shaft; said fuse means having a frangible portion operable to fail at a driving torque level less than the critical torque level of said driveshaft means; and,
    (c) said transmission including housing means with auxiliary bearing means journalling the end of said fuse means connected to said input end of said driveshaft means, said transmission including a fluid lubricant within said housing means; and, (d) first seal means contacting the outer surface of said fuse means and second seal means sealing the interior of said fuse means for preventing loss of said lubricant.

3. The driveline improvement defined in claim 2, wherein said fuse means comprises a tubular member with a washer attached therein with fastening means received through said washer securing said fuse means to said transmission output shaft.

4. The driveline improvement defined in claim 2, wherein said fuse means comprises a tubular member with a washer swaged therein with fastening means securing said washer to said transmission output shaft.

* * * * *